US010755012B2

United States Patent
Muthiah et al.

(10) Patent No.: US 10,755,012 B2
(45) Date of Patent: Aug. 25, 2020

(54) SYSTEM AND METHOD FOR GENERATING A FUNCTIONAL SIMULATIONS PROGRESS REPORT

(71) Applicant: HCL Technologies Limited, Noida (IN)

(72) Inventors: Manickam Muthiah, Chennai (IN); Sathish Kumar Krishnamoorthy, Chennai (IN)

(73) Assignee: HCL Technologies Limited, Noida, Uttar Pradesh ( * ) Notice: Subject to any disclaimer, the term of this patent is extended or adjusted under 35 U.S.C. 154(b) by 71 days.

(21) Appl. No.: 16/128,525

(22) Filed: Sep. 12, 2018

(65) Prior Publication Data
US 2019/0294738 A1    Sep. 26, 2019

(30) Foreign Application Priority Data
Mar. 23, 2018    (IN) .............................. 201811010865

(51) Int. Cl.
*G06F 30/3323* (2020.01)
*G06F 30/30* (2020.01)
*G06F 111/20* (2020.01)

(52) U.S. Cl.
CPC .......... *G06F 30/3323* (2020.01); *G06F 30/30* (2020.01); *G06F 2111/20* (2020.01)

(58) Field of Classification Search
USPC ......................................................... 716/136
See application file for complete search history.

(56) References Cited

U.S. PATENT DOCUMENTS

| 2007/0156939 | A1* | 7/2007 | Farchi | G06F 9/524 710/200 |
| 2013/0339930 | A1* | 12/2013 | Xu | G06F 11/3684 717/125 |

* cited by examiner

*Primary Examiner* — Eric D Lee
(74) *Attorney, Agent, or Firm* — HM Law Group LLP; Vanintheran Moodley

(57) ABSTRACT

The present disclosure relates to system(s) and method(s) for generating a functional simulation's progress report simultaneously when the simulation is in progress. The system comprises a testbench and a DUV/SUV connected to the testbench. The testbench generates a set of input data/packets in order to simulate and verify the DUV/SUV. The system is configured to identify one or more components, from a set of components in the testbench. Furthermore, the system receives one or more current progress messages from the one or more components and identifies one or more component Lock-Up conditions based on the processing of the one or more current progress messages and one or more previous progress messages. Further, the system executes one or more actions to resolve the one or more component Lock-Up conditions. Furthermore, the system generates a simulation progress report, simultaneously at runtime, during the simulation.

15 Claims, 3 Drawing Sheets

SYSTEM AND METHOD FOR GENERATING A FUNCTIONAL SIMULATIONS PROGRESS REPORT

CROSS-REFERENCE TO RELATED APPLICATIONS AND PRIORITY

The present application claims benefit from Indian Complete Patent Application No. 201811010865 filed on 23 Mar. 2018 the entirety of which is hereby incorporated by reference.

TECHNICAL FIELD

The present disclosure in general relates to the field of hardware logic/electronic design/digital circuits verification. More particularly, the present invention relates to generate a functional simulation's progress report.

BACKGROUND

Integrated Circuit Design (ICD) or Chip Design is a branch of electronics engineering. ICD deals with encompassing the particular logic and circuit design techniques required for designing integrated circuits, or ICs. Initially, the integrated circuits contained only a few transistors. However, the number of transistors in the integrated circuits has increased dramatically since then. The term "Large Scale Integration" (LSI) was first used to describe this theoretical concept, which further gave rise to the terms "Small-Scale Integration" (SSI), "Medium-Scale Integration" (MSI), "Very-Large-Scale Integration" (VLSI), and "Ultra-Large-Scale Integration" (ULSI). The development of VLSI started with hundreds of thousands of transistors in the early 1980s, and has continued beyond ten billion transistors as of now.

Modern ICs are immensely complicated. The complexity of modern IC design and market pressure for producing designs rapidly has led to the extensive use of automated design tools in process of IC designing. In short, the design of an IC using an Electronic Design Automation (EDA) is the process of design, verification and testing of the instructions that the IC has to carry out.

The Electronic Design Automation (EDA) and an Electronic Computer-Aided Design (ECAD) is a category of tools that is used to design electronic systems such as integrated circuits as well as printed circuit boards. Designers use these tools that work together in a flow to design and analyze the entire semiconductor chips. The EDA tools are essential for designing modern semiconductor chips which have billions of components. The EDA tools help chip design with programming languages that compiled them to silicon. Due to immediate result, there was a considerable increase in the complexity of the chips that could be designed, with improved access to design verification tools that are based on Logic Simulation. A chip designed using this process is easier to layout and more likely to function correctly, since the design of the chip could be simulated more thoroughly prior to construction. Although the languages and tools have evolved, this general approach of specifying the desired behaviour in a textual programming language and letting the tools derive the detailed physical design has remained the basis of digital IC design even today.

A Simulation (or "sim") is an attempt to model a real-life or hypothetical situation on a computer to study the working of the system. Predictions may be made about the behaviour of the system, by changing variables in the simulation. It is a tool to virtually investigate the behaviour of the system under study.

A Logic simulation is the use of simulation software for predicting the behaviour of digital circuits and Hardware Description Languages (HDL). It simulates the logic before it is built. Simulations have the advantage of providing a familiar look and feel to the user in that it is constructed from the same language and symbols used in design. Simulation is a natural way for the designer to get feedback on their design, by allowing the user to interact directly with the design. Logic simulation may be used as part of the Functional Verification process in designing hardware.

Functional verification is the process followed for verifying whether the logic design conforms to the design specification. In everyday terms, the functional verification asserts whether the proposed design do what is intended. This is a complex task, and takes the majority of time and effort in largest electronic system design projects.

Hardware Description language (HDL) is a specialized computer language used for describing the structure and behaviour of electronic circuits, and most commonly, digital logic circuits. A hardware description language enables a precise, formal description of an electronic circuit which allows for the automated analysis and simulation of an electronic circuit. A hardware description language is much like a programming language such as C Programming language. HDL is a textual description language consisting of expressions, statements and control structures. One important difference between most programming languages and HDLs is that HDLs explicitly include the notion of time. The key advantage of a HDL, when used for systems design, is that it allows the behaviour of the required system to be described (modelled) and verified (simulated) before synthesis tools translate the design into real hardware (gates and wires). With time, VHDL and Verilog emerged as the dominant HDLs in the electronics industry, while older and less capable HDLs gradually disappeared. Over the years, much effort has been invested in improving HDLs. The latest iteration of Verilog, formally known as System Verilog, introduces many new features (classes, random variables, and properties/assertions) to address the growing need for better testbench randomization, design hierarchy, and reuse.

A testbench is an (often virtual) environment used to verify the correctness or soundness of a design or model. In the context of firmware or hardware engineering, a testbench refers to an environment in which the design/system/product under development is verified with the aid of software and hardware tools. The suite of verification tools is designed specifically for the design/system/product under verification. Testbench, commonly referred as verification environment (or just environment) contains a set of components such as bus functional models (BFMs), bus monitors, memory modules, and interconnect of such components with the Design Under Verification (DUV).

A simulation environment is typically composed of several types of components. The Generator generates input vectors that are used to search for anomalies that exist between the intent (specifications) and the implementation (HDL Code). Modern generators create directed-random and random stimuli that are statistically driven to verify random parts of the design. The randomness is important to achieve a high distribution over the huge space of the available input stimuli. To this end, users of these generators intentionally under-specify the requirements for the generated tests. It is the role of the generator to randomly fill this gap. This allows the generator to create inputs that reveal bugs not being searched by the user. The generators also bias the stimuli towards design corner cases to further stress the logic. Biasing and randomness serve different goals and there are trade-offs between them. As a result, different generators have a different mix of these characteristics. Since the input for the design must be valid (legal) and many targets (such as biasing) should be maintained, many generators use the Constraint Satisfaction Problem (CSP) technique to solve the complex verification requirements. The legality of the design inputs and the biasing arsenal are modelled. The model-based generators use this model to produce the correct stimuli for the target design.

Drivers translate the stimuli produced by the generator into the actual inputs for the design under verification. The generators create inputs at a high level of abstraction, as transactions and drivers convert this input into actual design inputs as defined in the specification of the design's interface.

A Monitor converts the state of the design and its outputs to a transaction abstraction level so it can be stored in a scoreboard's database to be checked later on.

The Scoreboard/Checker validates that the contents of the scoreboard are legal. There are cases where the generator creates expected results, in addition to the inputs. In these cases, the checker must validate that the actual results match the expected ones.

An Arbitration Manager is configured to manage all the above components together.

The simulator produces the outputs of the design, based on the design's current state (the state of the flip-flops) and the injected inputs. The simulator has a description of the design net-list. This description is created by synthesizing the HDL to a low gate level net-list.

Simulation based verification is widely used to "simulate" the design, since this method scales up very easily. Stimulus is targeted to exercise each line in the HDL code. A testbench is built to functionally verify the design by providing meaningful scenarios to check that given certain input, the design performs to the specification.

The level of effort required to debug and then verify the design is proportional to the maturity of the design. That is, early in the design's life, bugs and incorrect behaviour are usually found quickly. As the design matures, the simulation requires more time and resources to run, and errors will take progressively longer to be found.

One of the most critical tasks in developing a new hardware such as Integrated Circuit (IC) chips, Field-Programmable Gate Arrays (FPGA), Application-Specific Integrated Circuits (ASIC), System On Chips (SOC) etc. is to verify them for different design/function/performance specifications. These specifications may be predefined by the customer of the chips or can be an industry standard too. Another challenge faced by the verification team of this hardware is to debug the failures (if any) that arise during the process of verification using the log file(s) and identify the root cause of the failure.

The input packets entering a Design Under Verification/System Under Verification (DUV/SUV) are used to excite and verify the DUV/SUV during simulation. However, in a functional verification environment, the simulation may run for a long time before its completion. In this case, a defect may occur at certain point during the simulation, that hinders progress of the simulation. In case of occurrence of the defect, a user may have to re-run the entire simulation from the initial point, after fixing the defect. In this case, the user may have to spend a lot of time in determining the defect and fixing the defect. But, generation of a progress report of the simulation might help the user to identify and resolve the defect early on. Currently, there is no standard way to generate the progress report of the simulation when the simulation is underway.

SUMMARY

This summary is provided to introduce aspects related to systems and methods for generating a functional simulation's progress report and the aspects are further described below in the detailed description. This summary is not intended to identify essential features of the claimed subject matter nor is it intended for use in determining or limiting the scope of the claimed subject matter.

In one embodiment, a system for generating a functional simulation's progress report, simultaneously when the simulation is in progress, is illustrated. The system may comprise a Design Under Verification or System Under Verification (DUV/SUV) and a testbench configured to communicate with the DUV/SUV. The DUV/SUV may be configured to process a set of input data/packets generated by a "stimulus generation unit" of the testbench. The set of input data/packets may be configured to verify the DUV/SUV. The "stimulus generation unit" of the testbench may be further configured to generate stimulus for the DUV/SUV based on a target test case from a set of test cases. The testbench further comprises a "simulation progress reporter unit" to identify components and process the progress message(s) from the components to generate a simulation progress log file. Further, a "components identification unit", of the "simulation progress reporter unit", may be configured to identify one or more components, from a set of components in the testbench. The one or more components may correspond to components of a verification environment associated with the testbench. Furthermore, a "message processing unit", of the "simulation progress reporter unit", may be configured to periodically receive one or more current progress messages from the one or more components. The one or more current progress messages may indicate current progress of the one or more components, at runtime, during the simulation associated with the target test case. Furthermore, a "condition identification unit", of the "simulation progress reporter unit", may be configured to identify one or more component Lock-Up conditions, associated with the current progress of the one or more components. The one or more component Lock-Up conditions may be identified based on comparison of the one or more current progress messages and one or more previous progress messages, from a set of previous progress messages, received from the one or more components. The set of previous progress messages may be stored in a repository. Furthermore, a "action processing unit", of the "simulation progress reporter unit", may be configured to execute one or more actions to resolve the one or more component Lock-Up conditions. The one or more actions may be stored at the repository. Furthermore, a "log generation unit", of the "simulation progress reporter unit", may be configured to, periodically, generate a simulation progress report, associated with the simulation of the target test case, at runtime, during the simulation. The simulation progress report may be generated based on the one or more progress messages, the one or more component Lock-Up conditions and the one or more actions.

In another embodiment, a method for generating a functional simulation's progress report, simultaneously when the simulation is in progress, is illustrated. The method may comprise generating, by a "stimulus generation unit", a set of input data/packets to verify a Design Under Verification or System Under Verification (DUV/SUV). The DUV/SUV may be simulated based on a target test case from a set of test cases. Further, the method may comprise identifying, by a "component identification unit", one or more components, from a set of components in a testbench. The one or more components may correspond to components of a verification environment associated with the testbench. Further, the method may comprise receiving, by a "message processing unit", one or more current progress messages, from one or more components. The one or more current progress messages may indicate current progress of the one or more components, during the simulation, associated with the target test case. Furthermore, the method may comprise identifying, by a "condition identification unit", one or more component Lock-Up conditions associated with the current progress of the one or more components. The one or more component Lock-Up conditions may be identified based on comparison of the one or more current progress messages and one or more previous progress messages, from a set of progress messages, received from the one or more components. The set of previous progress messages may be stored in a repository. Furthermore, the method may comprise executing, by a "action processing unit", one or more actions to resolve the one or more component Lock-Up conditions. The one or more actions may be stored at the repository. The method may further comprise generating, by a "log generation unit", a simulation progress report, periodically, associated with the simulation of the target test case at runtime during the simulation. The simulation progress report may be generated based on the one or more progress messages, the one or more component Lock-Up conditions and the one or more actions.

In yet another embodiment, a computer program product having embodied computer program for generating a functional simulation's progress report simultaneously when the simulation is in progress is disclosed. In one embodiment, the program may comprise a program code for generating a set of input data/packets to verify a Design Under Verification or System Under Verification (DUV/SUV). The DUV/SUV may be simulated based on a target test case from a set of test cases. Further, the program may comprise a program code for identifying one or more components, from a set of components in a testbench. The one or more components may correspond to components of a verification environment associated with the testbench. Further, the program may comprise a program code for receiving one or more current progress messages, from one or more components. The one or more current progress messages may indicate current progress of the one or more components, during the simulation, associated with the target test case. Furthermore, the program may comprise a program code for identifying one or more component Lock-Up conditions associated with the current progress of the one or more components. The one or more component Lock-Up conditions may be identified based on comparison of the one or more current progress messages and one or more previous progress messages, from a set of progress messages, received from the one or more components. The set of previous progress messages may be stored in a repository. Furthermore, the program may comprise a program code for executing one or more actions to resolve the one or more component Lock-Up conditions. The one or more actions may be stored at the repository. The program may further comprise a program code for generating a simulation progress report, periodically, associated with the simulation of the target test case at runtime during the simulation. The simulation progress report may be generated based on the one or more progress messages, the one or more component Lock-Up conditions and the one or more actions.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
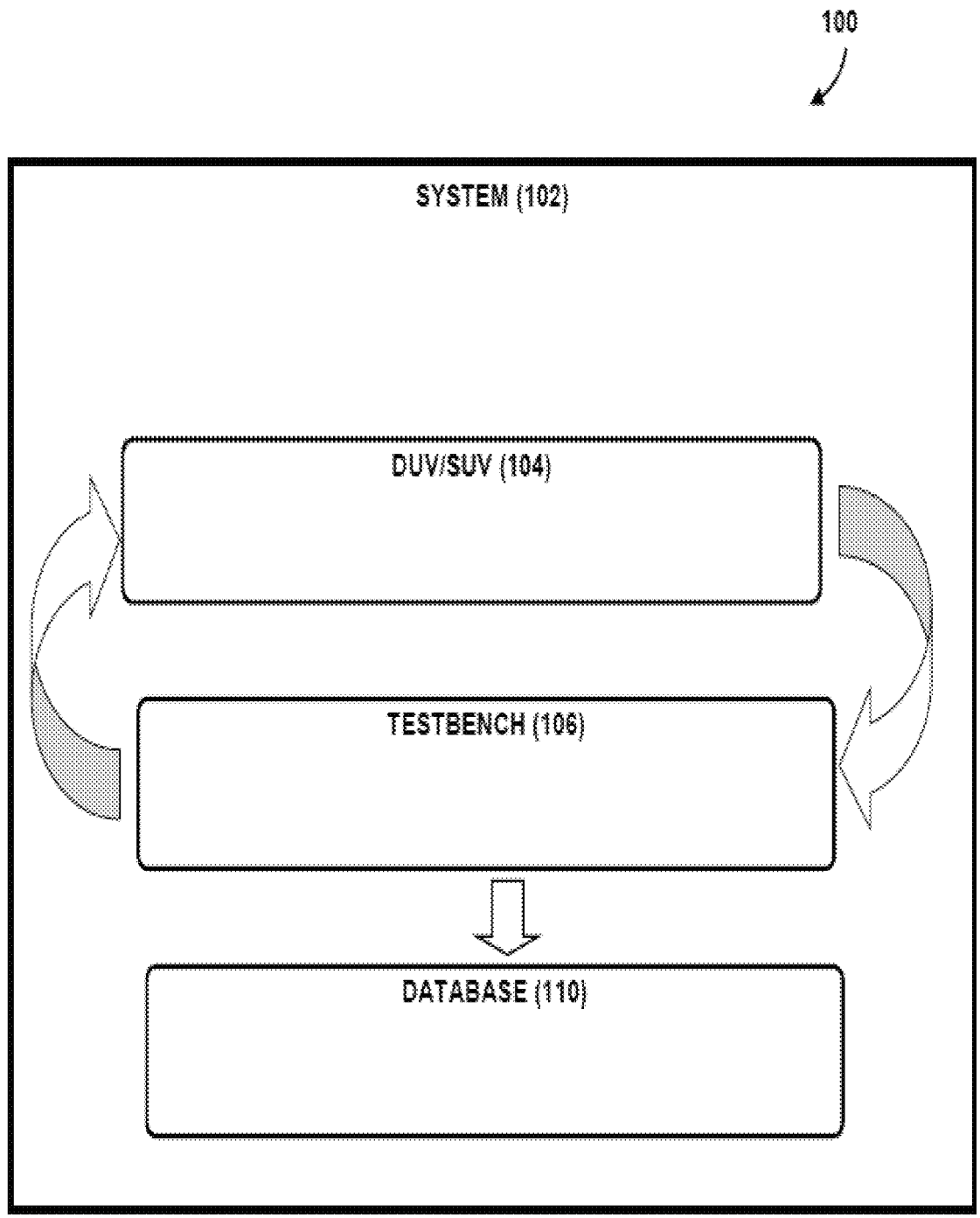
FIG. 1 illustrates an overview of a system configured to generate a functional simulation's progress report simultaneously when the simulation is in progress, in accordance with an embodiment of the present subject matter.

The present system facilitates/provides the means for generating a functional simulation's progress report simultaneously when the simulation is in progress. The progress report for a functional simulation of a Design Under Verification or System Under Verification DUV/SUV may be generated based on the progress of one or more components, associated with a verification environment, or identifying a component Lock-Up condition associated with one or more components, used for the functional simulation. The component Lock-Up condition may be resolved using an action, stored in a repository. The DUV/SUV may correspond to a design of an electronic circuit or a design of an integrated chip written in a Hardware Description Language (HDL). The system comprises a DUV/SUV and a testbench configured to communicate with the DUV/SUV.

In one embodiment, the testbench may enable a "stimulus generation unit" to generate a set of input data/packets. The set of input data/packets may correspond to a stimulus. The set of input data/packets may be configured to verify and simulate the DUV/SUV based on a target test case, from a set of test cases. In one aspect, the DUV/SUV may be configured to process the set of input data/packets received from the testbench. Further, the testbench may enable a "simulation progress reporter unit" to identify components, and process the progress messages from the components and generate a simulation progress log file.

In one aspect, a "component identification unit", of the "simulation progress reporter unit", may be configured to identify one or components, from a set of components in the testbench. The one or more components correspond to components of a verification environment, associated with the testbench. In one aspect, the set of components may correspond to an interface or a bus driver, an interface or a bus monitor, a scoreboard, a coverage monitor and the like. Once the one or more components are identified, a "message processing unit", of the "simulation progress reporter unit", may be configured to receive one or more current progress messages from the one or more components. The one or more current progress messages may be received periodically. In one embodiment, the one or more progress messages may indicate current progress of the one or more components, at runtime, during the simulation, associated with the target test case. In one aspect, a message type of the one or more current progress messages, associated with the one or more components, may be pre-defined. In the aspect, the message type may be one of a first message type, a second message type, and a third message type. Further, the first message type may comprise a component name, a component processed packets count and a component current status. Furthermore, the second message type may comprise a component name, a component data path, a component expected output packets count, and a component actual output packets count. Furthermore, the third message type may comprise a component name, a cover group name, and a coverage percentage.

Upon receiving the one or more current progress messages, a "condition identification unit", of the "simulation progress reporter unit", may be configured to identify one or more component Lock-Up conditions, associated with the current progress of the one or more components. The one or more component Lock-Up conditions may be identified based on comparison of the one or more current progress messages and one or more previous progress messages, from a set of previous progress messages. In one embodiment, the set of previous progress messages may be stored in a repository.

Once the one or more component Lock-Up conditions are identified, a "action processing unit", of the "simulation progress reporter unit", may be configured to execute one or more actions to resolve the one or more component Lock-Up conditions. In one embodiment, the one or more actions may be stored in the repository. The one or more actions may correspond to termination of the simulation, or continuation of the simulation by addressing the component Lock-Up condition, or ignoring the component Lock-Up condition, associated with the target test case.

Further, a "log generation unit", of the "simulation progress reporter unit", may be configured to generate a simulation progress report, associated with the target test case, at runtime, during the simulation. The simulation progress report may be generated based on the one or more current progress messages, the one or more component Lock-Up conditions and the one or more actions.

Referring now to FIG. 1, an overview of a system 102 configured to generate a functional simulation's progress report simultaneously when the simulation is in progress is illustrated. The system 102 includes a testbench 106 configured to communicate with a DUV/SUV 104. Further, the testbench 106 may be connected to a database 110. In one embodiment, the DUV/SUV 104 may process a set of input data/packets. The processing of the set of input data/packets may correspond to simulation of a target test case, from a set of test cases.

In one embodiment, the testbench 106 may be configured to generate and transmit a number of input data/packets to the DUV/SUV 104 in order to verify the DUV/SUV 104 based on the target test case, from the set of test cases.

In one embodiment, the testbench 106 may be configured to identify one or more components, from a set of components. The set of components may be associated with the testbench 106. The set of components may correspond to an interface or a bus driver, an interface or a bus monitor, a scoreboard, a coverage monitor and the like.

Once the one or more components are identified, the testbench 106 may be configured to receive one or more current progress messages from the one or more components. In one embodiment, the one or more current progress messages may correspond to current progress of the one or more components, at runtime, during the simulation of the target test case. Further, a message type of the one or more current progress messages may be pre-defined. The message type may correspond to one of a first message type, a second message type or a third message type. In one aspect, the first message type may comprise a component name, a component processed packets count and a component current status. The second message type may comprise a component name, a component data path, a component expected output packets count, and a component actual output packets count. The third message type may comprise a component name, a cover group name, and a coverage percentage.

Upon receiving the one or more current progress messages, the testbench 106 may be configured to compare the one or more current progress messages and one or more previous progress messages, from a set of previous progress messages, associated with the one or more components. Based on the comparison, the testbench 106 may identify one or more component Lock-Up conditions, associated with the current progress of the one or more components.

In one embodiment, the testbench 106 may identify the one or more component Lock-Up conditions based on comparing a previous component processed packets count, from a previous progress message, and a component processed packets count, from the current progress message. Further, if the previous component processed packets count matches the component processed packet count and a component current status is Busy status, then the testbench 106 may be configured to compare the component current status and a component previous status. The component previous status may be stored in 'last_state_type_id'. Furthermore, if the component current status matches the component previous status, then the testbench 106 may be configured to determine a difference between a current time ($time) value and the 'last_busy_type_id' value, corresponding to the component. Furthermore, the testbench 106 may be configured to compare the difference and a pre-defined time value, associated with the component. In one aspect, the testbench 106 may identify that the component is locked-up or in a stuck state, when the difference is greater than the pre-defined time value. In one aspect, the locked-up or the stuck state corresponds to the component Lock-UP condition. Once the component Lock-UP condition is identified, the testbench 106 may execute an action to resolve the component Lock-UP condition. In another aspect, when the difference is not greater than the pre-defined value, there may be no need to execute any action.

Once the component Lock-Up conditions are identified, the testbench 106 may be configured to execute one or more actions to resolve the one or more component Lock-Up conditions. In one embodiment, the one or more actions may be stored in the repository. The one or more actions may correspond to termination of the simulation, continuation of the simulation by addressing the component Lock-Up condition, or continuation of the simulation by ignoring the component Lock-Up condition.

Further, the testbench 106 may be configured to generate a simulation progress report based on the one or more current progress messages, the one or more component Lock-Up conditions, and the one or more actions. The simulation progress report may be associated with the simulation of the target test case. In one embodiment, the simulation progress report may be generated periodically during the simulation. Further, the testbench 106 may generate a simulation progress log file, comprising the periodic simulation progress reports associated with simulation of the target test case, from the set of test cases. In one aspect, the simulation progress log file may comprise the periodic simulation progress reports indicating the progress of the test case from the set of test cases at different times during the simulation of the test case. In one embodiment, the testbench 106 may store the simulation progress log file in the database 110. The process of generating a functional simulation's progress report simultaneously when the simulation is in progress is further elaborated with respect to FIG. 2.

Figure 2:
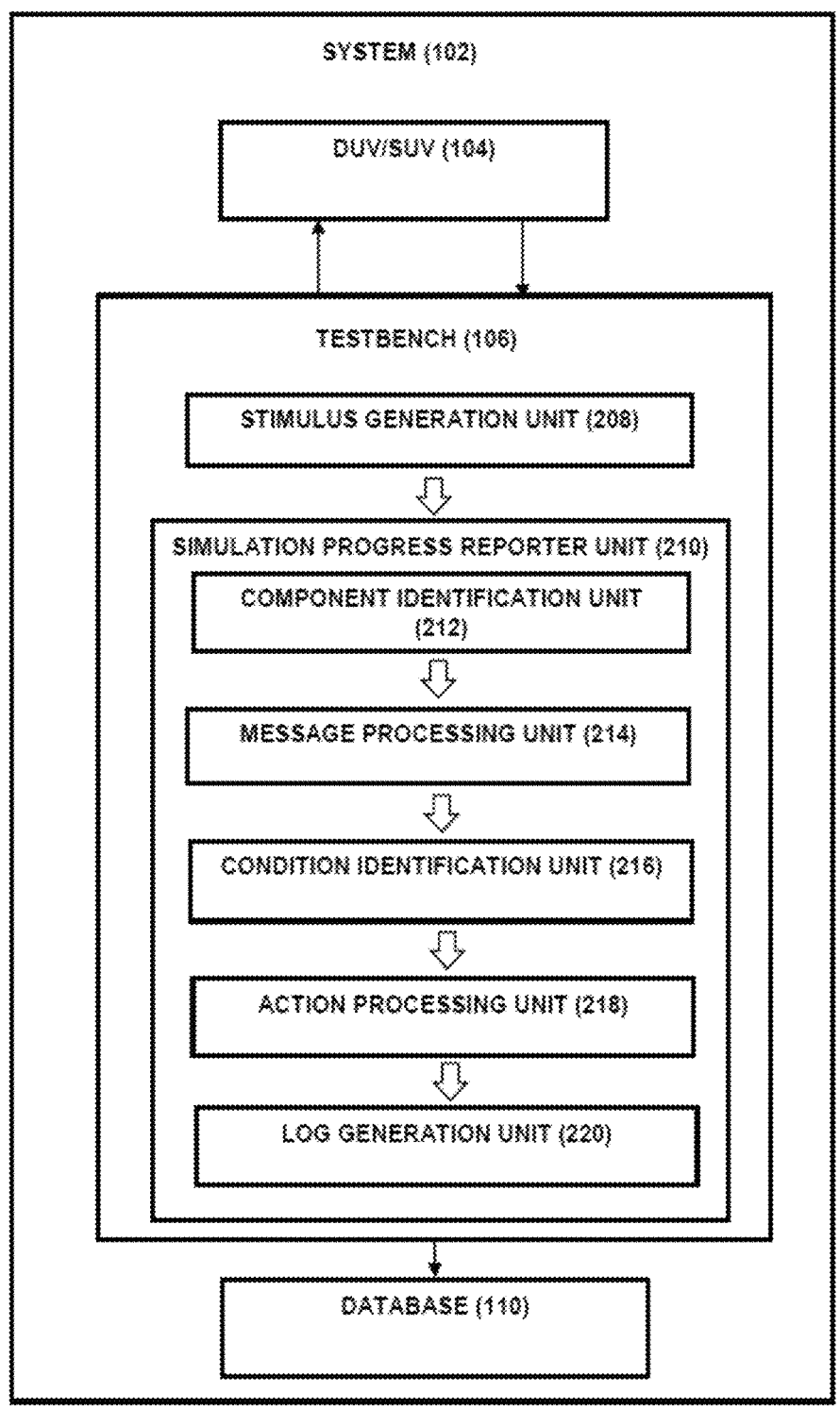
FIG. 2 illustrates components of the system for generating a functional simulation's progress report simultaneously when the simulation is in progress, in accordance with an embodiment of the present subject matter.

Referring now to FIG. 2, the system 102 is illustrated in accordance with an embodiment of the present subject matter. In one embodiment, the system 102 comprises the DUV/SUV 104 connected to the testbench 106. Further, the testbench 106 may include a "stimulus generation unit" 208, and a "simulation progress reporter unit" 210. The "simulation progress reporter unit" 210 may further include a "component identification unit" 212, a "message processing unit" 214, a "condition identification unit" 216, a "action processing unit" 218 and a "log generation unit" 220.

In one embodiment, based on the configuration inputs provided by a user, the "stimulus generation unit" 208 may be configured to generate a set of input data/packets. Once the set of input data/packets is generated, the testbench 106 may be configured to transmit the set of input data/packets to the DUV/SUV 104. In one implementation, the "stimulus generation unit" 208 of the testbench 106 may transmit the set of input data/packets to the DUV/SUV 104. The DUV/SUV 104 may be configured to process the set of input data/packets. The processing of the set of input data/packets may correspond to simulation, associated with a target test case, from a set of test cases.

Further, the "component identification unit" 212 may be configured to identify one or more components, from a set of components in the testbench 106. In one example, the set of components may correspond to components associated with simulation of the set of test cases. In one embodiment, the one or more components, from the set of components, may correspond to various components of a verification environment, associated with the testbench 106. The set of components may correspond to an interface or a bus driver, an interface or a bus monitor, a scoreboard, a coverage monitor and the like.

Upon identifying the one or more components, the "message processing unit" 214 may be configured to receive one or more current progress messages from the one or more components. In one aspect, the one or more current progress messages may be received periodically, at runtime, during the simulation of the target test case. The one or more current progress messages may correspond to current progress of the one or more components during the simulation of the target test case. In one embodiment, a message type, of the one or more current progress messages, associated with the one or more components, may be pre-defined. The message type may correspond to one of a first message type, a second message type, or a third message type. In one aspect, the first message type may correspond to type1, the second message type may correspond to type2, and the third message type may correspond to type3. In one embodiment, the one or more current progress messages with first message type may be received for the one or more components such as the interface or the bus drivers, the interface or the bus monitors and the like. In the embodiment, the second message type may be received from the component such as the scoreboard. In the embodiment, the third message type may be received for the one or more components such as coverage monitors, coverage collectors and the like.

In one embodiment, the first message type may comprise a component name, a component processed packets count and a component current status. The component name may be unique. Further, the component name may be used to identify a component, from which the current progress message is received. In one aspect, the component name may be string data. Further, the component processed packets count may correspond to number of packets processed by the component till the time of receiving the current progress message from the component. In one aspect, the component processed count may be an integer data type. Furthermore, the component current status may correspond to current status of the component, at the time of receiving the current progress message from the component. The component current status may be one of Busy status or Ready status. The Busy status may indicate that the component is actively processing an input data/packet. The Ready status may indicate that the component is either in an idle state or waiting for next input data/packet. Further, the first message type may be as shown in the Table 1.

TABLE 1

| First message type | | |
| --- | --- | --- |
| Component Name | Component Processed Packets Count | Component Current Status |

In another embodiment, the second message type may comprise a component name, a component data path, a component expected output packets count, and a component actual output packets count. In one aspect, the component name may be unique. Further, the component name may be used to identify the component, from which the current progress message is received. The component name may be a string data type. Further, the component data path may be a unique data path name. The component data path may be used to identify data path corresponding to the component. In one aspect, the component data path may be a string data type. Furthermore, the component expected output packets count may correspond to number of packets expected at DUV/SUV output for the component data path. In one aspect, the component expected output packets count may be an integer data type. Furthermore, the component actual output packets count may correspond to number of packets at the DUV/SUV output for the component data path. In one aspect, the component actual output packets may be an integer data type. Further, the second message type may be as shown in Table 2.

TABLE 2

| Second message type | | | |
| --- | --- | --- | --- |
| Component Name | Component Data Path | Component Expected Output Packets Count | Component Actual Output Packets Count |

In yet another embodiment, the third message type may comprise a component name, a cover group name, and a coverage percentage. In one aspect, the component name may be unique. Further, the component name may be used to identify the component, from which the current progress message is received. In one aspect, the component name may be a string data type. Further, the cover group name associated with the component may be used to identify a functional coverage cover group instance. The cover group name may be a string data type. Furthermore, the coverage percentage may correspond to the percentage of functional coverage achieved for the respective cover group instance associated with the component. The coverage percentage may be a real data type. Further, the third message type may be as shown in Table 3.

TABLE 3

Third message type

| Component Name | Cover group Name | Coverage percentage |
|---|---|---|

Once the one or more current progress messages are received, the "message processing unit" 214 may be configured to identify the message type based on processing each message, from the one or more current progress messages. Based on the message type, the "message processing unit" 214 may determine processing of each message from the one or more current progress messages.

Further, "condition identification unit" 216 may be configured to compare the one or more current progress messages and one or more previous progress messages, from a set of previous progress message. In one embodiment, the set of previous progress message may be stored in a repository. The one or more previous progress messages may be associated with the one or more components in the testbench 106. In one example, the message type of the current progress message and the previous progress message may be same. Further, the "condition identification unit" 216 may identify one or more component Lock-Up conditions, associated with the one or more components, based on the comparison of the one or more current progress messages and the one or more previous progress messages.

In one embodiment, the "condition identification unit" 216 may identify the one or more component Lock-Up conditions based on comparing a previous component processed packets count, from a previous progress message, and a component processed packets count, from a current progress message. Further, if the previous component processed packets count matches the component processed packet count and a component current status is Busy status, then the "component identification unit" 216 may be configured to compare the component current status and a component previous status. The component previous status may be stored in 'last_state_type_id'. Furthermore, if the component current status matches the component previous status, then the "component identification unit" 216 may be configured to determine a difference between a current time ($time) value and the 'last_busy_type_id' value, corresponding to the component. Furthermore, the "component identification unit" 216 may be configured to compare the difference and a pre-defined time value, associated with the component. In one aspect, the "component identification unit" 216 may identify that the component is locked-up or in a stuck state, when the difference is greater than the pre-defined time value. In one aspect, the locked-up or the stuck state corresponds to the component Lock-UP condition. Once the component Lock-UP condition is identified, the testbench 106 may be configured to execute an action. In another aspect, when the difference is not greater than the pre-defined value, there may be no need to execute any action.

Upon identifying the one or more component Lock-Up conditions, the "action processing unit" 218 may be configured to execute one or more actions to resolve the one or more component Lock-Up conditions. In one aspect, the one or more actions may be stored in the repository. The one or more actions may correspond to termination of the simulation, continuation of the simulation by addressing the component Lock-Up condition, or continuation of the simulation by ignoring the component Lock-Up condition. In this case, once the "condition identification unit" 216 identifies the one or more component Lock-Up conditions, the "action processing unit" 218 may execute the action, associated with the one or more component Lock-Up conditions, to resolve the component Lock-Up condition.

In one embodiment, the "message processing unit" 214 may identify the message type as the first message type. Further, the "condition identification unit" 216, of the "simulation progress reporter unit" 210, may be configured to compare the component processed packets count, from the current progress message, and a previous component processed packets count, from the previous progress message. In one aspect, if the component processed packet count is not matching the previous component processed packets count, and the component current status is in Busy status, then the "condition identification unit" 216 may store a current time ($time), associated with the component in an array variable 'time last_busy_type_id[string]'. In this case, an array index of the variable indicates the component name. Further, the "condition identification unit" 216 may be configured to store the component current status in an array variable 'last_state_type_id[string]'. In this case, the array index of the variable may indicate the component name.

In another aspect, if the component processed packet count is not matching the previous component processed packets count, and the component current status is in Ready status, then the "condition identification unit" 216 may store the component current status as Ready in an array variable 'last_state_type_id[string]'. In this case, the array index of the variable may indicate the component name.

In yet another aspect, if the component processed packets count is matching the previous component processed packets count, then the "condition identification unit" 216 may be configured to compare the component current status and a component previous status, from the previous progress message of the component. Further, if the component current status and the component previous status are matching, then the "condition identification unit" 216 may be configured to determine a difference between the current time ($time) and the 'last_busy_type_id', corresponding to the component. Further, the "condition identification unit" 216 may compare the difference with a pre-defined time value. In one embodiment, the component may be locked-up or in the stuck state, when the difference is greater than the pre-defined time value. In the embodiment, the difference being greater than the pre-defined time value is the component Lock-Up condition. Once the component Lock-Up condition is identified, the "action processing unit" 218 may be configured to execute the one or more actions to resolve the component Lock-Up condition. In this case, the "action processing unit" 218 may terminate the simulation, or reset the simulation.

In yet another aspect, if the component current status is not matching the component previous status, and the component current status is in Busy status, then the "condition identification unit" 216 may store the current status in a variable 'last_state_type_id' and the current time ($time) in an array variable 'last_busy_type_id' for the component.

In yet another aspect, if the component current status is not matching the component previous status, and the component current status is in Ready status, then the "condition identification unit" 216 may store the current status in the array variable 'last_state_type_id'. Further, the component processed packet count may be stored in an array 'int last_pkts_cnt_type_id[string]'. In one aspect, the component processed packets count may be stored in the array indexed using the unique component name.

In another embodiment, the "message processing unit" 214 may identify the message type as the second message type. Further, the "message processing unit" 214 may be configured to store the component expected output packets count as 'int exp_pkts_cnt_type2[string][string]'. In this case, the first array index may correspond to the component name and the second array index may correspond to the component data path. Further, the "message processing unit" 214 may store the component actual output packet count as 'int act_pkts_cnt_type2[string][string]'. In this case, the first array index may correspond to the component name and the second array index may correspond to the component data path.

In yet another embodiment, the "message processing unit" 214 may identify the message type as the third message type. Further, the "message processing unit" 214 may be configured to store the coverage percentage in an array variable 'real cov_percent_type3[string][string]'. In this case, the first array index may correspond to the component name and the second array index may correspond to the cover group name, associated with the component.

Further, the "log generation unit" 220 may be configured to generate a simulation progress report, associated with the simulation of the target test case. The simulation progress report may be generated periodically. The simulation progress report may be generated based on the one or more current progress messages from the one or more components, the one or more component Lock-Up conditions, the one or more actions and the like. In one aspect, the simulation progress report may comprise a current error count and a current warning count, associated with the simulation associated of the target test case. In one example, the simulation progress report may be in a form of table. In the example, a separate table may be generated for each message type, form the one or more components.

In one exemplary embodiment, the simulation progress report, associated with the simulation of the target test case is elaborated with respect to Table 4, Table 5, Table 6 and Table 7.

TABLE 4

Error and warnings

| Severity | Count |
|---|---|
| ERROR | 1 |
| WARNING | 2 |

Referring to the Table 4, count of an error and warning associated with the simulation is illustrated. The error count, for the simulation, is 1, and the warning count, for the simulation, is 2.

TABLE 5

Report for component with first message type

| Component Name | Packets Count | Progress Status |
|---|---|---|
| AgentA_Driver | 14 | Okay |
| AgentA_Monitor | 12 | Okay |
| AgentB_Driver | 50 | Stuck |
| AgentB_Monitor | 13 | Okay |

TABLE 5-continued

Report for component with first message type

| Component Name | Packets Count | Progress Status |
|---|---|---|
| AgentC_Driver | 13 | Okay |
| AgentC_Monitor | 14 | Okay |

Referring to the Table 5, the simulation progress report for the components with first message type is illustrated. The component name is AgentA_Driver, the packet count for the component is 14, and the progress status of the component is Okay. Further, the component name is AgentA_Monitor, the packet count for the component is 12, and the progress status of the component is Okay. Further, the component name is AgentB_Driver, the packet count for the component is 50, and the progress status of the component is Stuck. Furthermore, the component name is AgentB_Monitor, the packet count for the component is 13, and the progress status of the component is Okay. Furthermore, the component name is AgentC_Driver, the packet count for the component is 13, and the progress status of the component is Okay. Furthermore, the component name is AgentC_Monitor, the packet count for the component is 14, and the progress status of the component is Okay.

TABLE 6

Report for component with second message type

| Component Name | Data Path | Expected output packet count | Actual output packet count |
|---|---|---|---|
| Scoreboard | Ingress Data Path | 17 | 17 |
| Scoreboard | Egress Data Path | 25 | 24 |

Referring to the Table 6, the simulation progress report for components with second message type is illustrated. The component name is Scoreboard, the data path is the ingress data path, the expected output packet count is 17, and the actual output packet count is 17. Further, the component name is Scoreboard, the data path is the egress data path, the expected output packet count is 25, and the actual output packet count is 24.

TABLE 7

Report for component with third message type

| Component Name | Cover group Name | Percentage coverage |
|---|---|---|
| CoverageMonitorA | CovergroupM | 10 |
| CoverageMonitorA | CovergroupN | 10 |
| CoverageMonitorB | CovergroupR | 9 |
| CoverageMonitorB | CovergroupS | 9 |

Referring to the Table 7, the simulation progress report for components with third message type is illustrated. The component name is CoverageMonitorA, the cover group name is CovergroupM, and the percentage coverage is 10. Further, the component name is CoverageMonitorA, the cover group name is CovergroupN, and the percentage coverage is 10. Furthermore, the component name is CoverageMonitorB, the cover group name is CovergroupR, and the percentage coverage is 9. Furthermore, the component name is CoverageMonitorB, the cover group name is CovergroupS, and the percentage coverage is 9.

Further, based on analysing the Table 4, Table 5, Table 6 and Table 7, the "simulation progress reporter unit" 210 may be configured to state whether the overall progress status, associated with the simulation of the target test case, is Blocked or Okay. In one embodiment, the "simulation progress reporter unit" 210 may further store the simulation progress log file in a database 110.

In one embodiment, a script may be further configured to generate a dynamic Consolidated Simulations' Progress Report associated with the simulations of multiple test cases from the set of test cases running simultaneously. The script parses the simulation progress log file for each test case that comprises the current progress of the corresponding test case from the set of test cases during the simulation of the test case.

In one exemplary embodiment, the dynamic Consolidated Simulations' Progress Report may be as shown in Table 8.

TABLE 8

Dynamic Consolidated Simulations' Progress Report

| Simulation Name | Current Error Count | Current Overall Functional Coverage % | Current Overall Progress Status |
| --- | --- | --- | --- |
| Simulation 1 | 0 | 40 | Blocked |
| Simulation 2 | 0 | 50 | Okay |
| Simulation 3 | 0 | 25 | Okay |
| Simulation 4 | 3 | 45 | Okay |
| Simulation 5 | 0 | 20 | Blocked |

Figure 3:
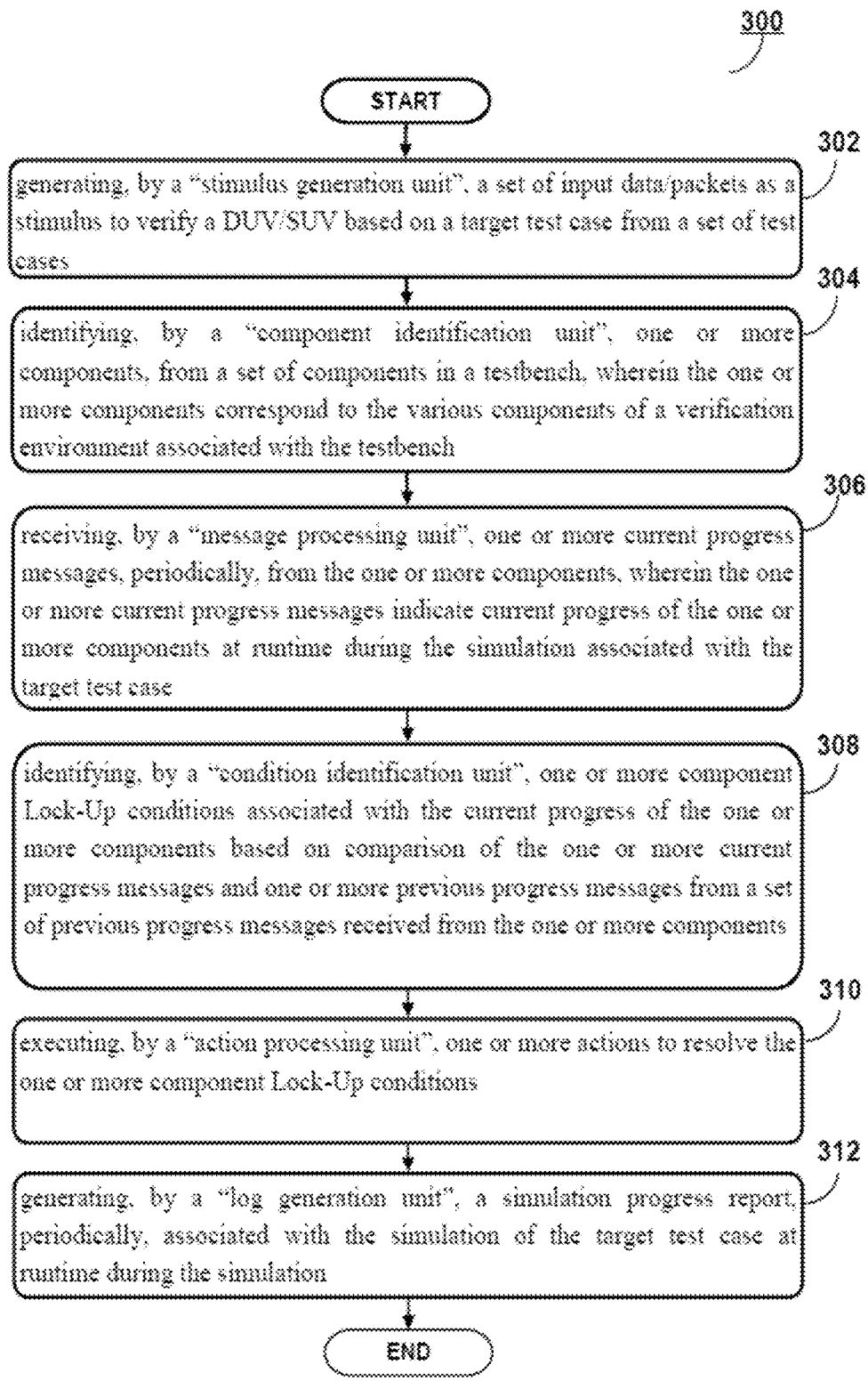
FIG. 3 illustrates a flow diagram to generate a functional simulation's progress report simultaneously when the simulation is in progress, in accordance with an embodiment of the present subject matter.

Referring now to FIG. 3, a method 300 for generating a functional simulation's progress report, simultaneously when the simulation is in progress, is disclosed, in accordance with an embodiment of the present subject matter. The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method 300 can be implemented in any suitable hardware, software, firmware, or combination thereof. However, for ease of explanation, in the embodiments described below, the method 300 may be considered to be implemented in the above described system 102.

At block 302, based on the configuration inputs provided by a user, a set of input data/packets may be generated. In one implementation, the "stimulus generation unit" 208 may be configured to generate the set of input data/packets. Once the set of input data/packets is generated, the testbench 106 may be configured to transmit the set of input data/packets to the DUV/SUV 104. In one implementation, the "stimulus generation unit" 208 of the testbench 106 may transmit the set of input data/packets to the DUV/SUV. The DUV/SUV 104 may be configured to process the set of input data/ packets. Further, the set of input data/packets may be used to simulate and verify the DUV/SUV 104, based on a target test case, from a set of test cases.

At block 304, one or more component, from a set of components in the testbench 106, may be identified. In one implementation, the "component identification unit" 212 may identify the one or more components. The one or more components, from the set of components, may be associated with the simulation of the target test case. The set of components may correspond to various components of a verification environment associated with the testbench 106. The set of components may correspond to an interface or a bus driver, an interface or a bus monitor, a scoreboard, a coverage monitor and the like.

At block 306, one or more current progress messages may be received from the one or more components. The one or more current progress messages may be received periodically and may correspond to current progress of the one or more components. In one implementation, the "message processing unit" 214 may be configured to receive the one or more current progress messages. In one aspect, a message type of the one or more current progress messages may be pre-defined. The message type may correspond to a first message type, a second message type and a third message type.

At block 308, one or more component Lock-Up conditions may be identified based on comparing the one or more current progress messages with one or more previous progress messages, from a set of previous progress messages. In one implementation, the "condition identification unit" 216 may be configured to identify the one or more component Lock-Up conditions.

In one embodiment, the "condition identification unit" 216 may identify the one or more component Lock-Up conditions based on comparing a previous component processed packets count, from a previous progress message, and a component processed packets count, from the current progress message. Further, if the previous component processed packets count matches the component processed packet count and a component current status is Busy status, then the "component identification unit" 216 may be configured to compare the component current status and a component previous status. The component previous status may be stored in 'last_state_type_id'. Furthermore, if the component current status matches the component previous status, then the "component identification unit" 216 may be configured to determine a difference between a current time ($time) and the 'last_busy_type_id', corresponding to the component. Furthermore, the "component identification unit" 216 may be configured to compare the difference and a pre-defined time value, associated with the component. In one aspect, the "component identification unit" 216 may identify that the component is locked-up or in a stuck state, when the difference is greater than the pre-defined time value. In one aspect, the locked-up or the stuck state corresponds to the component Lock-UP condition. Once the component Lock-UP condition is identified, the testbench 106 may be configured to execute an action. In another aspect, when the difference is not greater than the pre-defined value, there may be no need to execute any action.

At block 310, one or more actions may be executed to resolve the one or more component Lock-Up conditions. In one implementation, the "solution processing unit" 218 may be configured to execute the one or more actions. The one or more actions may correspond to termination of the simulation, continuation of the simulation by addressing the component Lock-Up condition, continuation of the simulation by ignoring the component Lock-Up condition, and the like.

At block 312, a simulation progress report may be generated for the simulation of the target test case. In one implementation, the "log generation unit" 220 may be configured to generate the simulation progress report. The simulation progress report may be generated periodically, at runtime, during the simulation of the target test case. In one aspect, the simulation progress log file may comprise the periodic simulation progress reports indicating the progress of the test case from the set of test cases at different times during the simulation of the test case. The simulation progress report may be based on the one or more current progress messages from the one or more components, the one or more component Lock-Up conditions, the one or more actions and the like.

We claim:

1. A system for generating a functional simulation's progress report simultaneously when the simulation is in progress, the system comprising:
    a Design Under Verification or System Under Verification (DUV/SUV), wherein the DUV/SUV is configured to process a set of input data/packets;
    a testbench configured to communicate with the DUV/SUV, wherein the testbench comprises:
        a stimulus generation unit configured to generate the set of input data/packets to verify the DUV/SUV, wherein the stimulus generation unit is further configured to simulate the DUV/SUV based on a target test case from a set of test cases;
        a simulation progress reporter unit configured to identify components and process progress message from the components to generate a simulation progress log file, wherein the simulation progress reporter unit comprises:
            a component identification unit configured to identify one or more components, from a set of components in the testbench, wherein the one or more components correspond to the various components of a verification environment associated with the test bench;
            a message processing unit configured to periodically receive one or more current progress messages from the one or more components, wherein the one or more current progress messages indicate current progress of the one or more components at runtime during the simulation associated with the target test case;
            a condition identification unit configured to identify one or more component Lock-Up conditions associated with the current progress of the one or more components based on comparison of the one or more current progress messages and one or more previous progress messages from a set of previous progress messages received from the one or more components, wherein the set of previous progress messages is stored in a repository;
            an action processing unit configured to execute one or more actions to resolve the one or more component Lock-Up conditions, wherein the one or more actions are stored at the repository; and
            a log generation unit configured to periodically generate a simulation progress report associated with the simulation of the target test case, simultaneously at runtime during the simulation, wherein the simulation progress report is generated based on the one or more current progress messages or the one or more component Lock-Up conditions and the one or more actions.

2. The system of claim 1, wherein the simulation progress reporter unit is further configured to generate a simulation progress log file associated with simulation of a test case from the set of test cases, wherein the simulation progress log file comprises the periodical simulation progress reports indicating the progress of the test case from the set of test cases at different times during the simulation of the test case.

3. The system of claim 1, wherein the one or more actions correspond to termination of the simulation, or continuation of the simulation by addressing the component Lock-Up condition or ignoring the component Lock-Up condition associated with the target test case.

4. The system of claim 1, wherein the condition identification unit is configured to identify the one or more component Lock-Up conditions, associated with a component, based on:
    comparing a previous component processed packets count, from a previous progress message, and a component processed packets count, from the current progress message;
    comparing a component current status and a component previous status, when the component current status is a Busy status, and the previous component processed packets count matches the component processed packets count, wherein the component previous status is indicated by 'last_state_type_id';
    determining a difference between a current time ($time) value and the 'last_busy_type_id' associated with the component, when the component current status matches the component previous status; and
    identifying the one or more component Lock-Up conditions based on comparison of the difference and a pre-defined time value associated with the component.

5. The system of claim 1, wherein the simulation progress report further comprises a current error count and a current warning count associated with the simulation of the target test case.

6. The system of claim 1, wherein the set of components correspond to an interface or a bus driver, an interface or a bus monitor, a scoreboard, or a coverage monitor, and wherein a message type of the current progress message associated with each component is pre-defined.

7. The system of claim 6, wherein the message type of the current progress messages may correspond to a first message type, a second message type, and a third message type, wherein the first message type may comprise a component name, a component processed packets count and a component current status, wherein the second message type may comprise a component name, a component data path, a component expected output packets count, and a component actual output packets count, and wherein the third message type may comprise a component name, a cover group name, and a coverage percentage.

8. A method for generating a functional simulation's progress report simultaneously when the simulation is in progress, the method comprising steps of:
    generating, by a stimulus generation unit, a set of input data/ packets to verify a Design Under Verification or System Under Verification (DUV/SUV), wherein the DUV/SUV is simulated based on a target test case from a set of test cases;
    identifying, by a component identification unit, one or more components, from a set of components in a testbench, wherein the one or more components correspond to the various components of a verification environment associated with the testbench;
    receiving, by a message processing unit, one or more current progress messages, periodically, from the one or more components, wherein the one or more current progress messages indicate a current progress of the one or more components at runtime during the simulation associated with the target test case;
    identifying, by a condition identification unit, one or more component Lock-Up conditions associated with the current progress of the one or more components based on comparison of the one or more current progress messages and one or more previous progress messages from a set of previous progress messages received from the one or more components, wherein the set of previous progress messages are is stored in a repository;

executing, by an action processing unit, one or more actions to resolve the one or more component Lock-Up conditions, wherein the one or more actions are stored at the repository; and generating, by a generation unit, a simulation progress report, periodically, associated with the simulation of the target test case simultaneously at runtime during the simulation, wherein the simulation progress report is generated based on the one or more current progress messages, the one or more component Lock-Up conditions and the one or more actions.

9. The method of claim 8, further comprises generating a simulation progress log file associated with simulation of a test case from the set of test cases, wherein the simulation progress log file comprises the periodical simulation progress reports indicating the progress of the test case from the set of test cases at different times during the simulation of the test case.

10. The method of claim 8, wherein the one or more actions correspond to termination of the simulation, or continuation of the simulation by addressing the component Lock-Up condition or ignoring the component Lock-Up condition associated with the target test case.

11. The method of claim 8, wherein the one or more component Lock-Up conditions, associated with a component, are identified based on:
   comparing a previous component processed packets count, from a previous progress message, and a component processed packets count, from the current progress message;
   comparing a component current status and a component previous status, when the component current status is a Busy status, and the previous component processed packets count matches the component processed packets count, wherein the component previous status is indicated by 'last_state_type_id';
   determining a difference between a current time ($time) value and the 'last_busy_type_id' associated with the component, when the component current status matches the component previous status; and
   identifying the one or more component Lock-Up conditions based on comparison of the difference and a pre-defined time value, associated with the component.

12. The method of claim 8, wherein the simulation progress report further comprises a current error count and a current warning count associated with the simulation of the target test case.

13. The method of claim 8, wherein the set of components correspond to an interface or a bus driver, an interface or a bus monitor, a scoreboard, or a coverage monitor, and wherein a message type of the current progress message associated with each component is pre-defined.

14. The method of claim 13, wherein the message type of the current progress messages may correspond to a first message type, a second message type, and a third message type, wherein the first message type may comprise a component name, a component processed packets count, and a component current status, wherein the second message type may comprise a component name, a component data path, a component expected output packets count, and a component actual output packets count, and wherein the third message type may comprise a component name, a cover group name, and a coverage percentage.

15. A non-transitory computer program product having embodied thereon a computer program for generating a functional simulation's progress report simultaneously when the simulation is in progress, the computer program product comprises:
   a program code for generating a set of input data/ packets to verify a Design Under Verification or System Under Verification (DUV/SUV), wherein the DUV/SUV is simulated based on a target test case from a set of test cases;
   a program code for identifying one or more components from a set of components in a testbench, wherein the one or more components correspond to the various components of a verification environment associated with the testbench;
   a program code for receiving one or more current progress messages, periodically, from the one or more components, wherein the one or more current progress messages indicate a current progress of the one or more components at runtime during the simulation associated with the target test case;
   a program code for identifying one or more component Lock-Up conditions associated with the current progress of the one or more components based on comparison of the one or more current progress messages and one or more previous progress messages from a set of previous progress messages received from the one or more components, wherein the set of previous progress messages is stored in a repository;
   a program code for executing one or more actions to resolve the one or more component Lock-Up conditions, wherein the one or more actions are stored at the repository; and
   a program code for generating a simulation progress report, periodically, associated with the simulation of the target test case simultaneously at runtime during the simulation, wherein the simulation progress report is generated based on the one or more current progress messages, the one or more component Lock-Up conditions and the one or more actions.

* * * * *